June 3, 1969 J. A. VALLEE 3,448,445

CONVERSION FROM SELF-CLOCKING CODE TO NRZ CODE

Filed June 17, 1965 Sheet 1 of 2

INVENTOR.
JOHN A. VALLEE
BY
Carl V. Olson
Attorney

INVENTOR.
JOHN A. VALLEE
BY
Carl V. Olson
Attorney

United States Patent Office 3,448,445
Patented June 3, 1969

3,448,445

CONVERSION FROM SELF-CLOCKING CODE TO NRZ CODE

John A. Vallee, Juno Beach, Fla., assignor to Radio Corporation of America, a corporation of Delaware Filed June 17, 1965, Ser. No. 464,734
Int. Cl. H04l *3/00;* H03k *13/02*
U.S. Cl. 340—347 7 Claims

ABSTRACT OF THE DISCLOSURE

A converter for deriving a simple non-return-to-zero (NRZ) information signal and a separate output clock pulse wave from an input signal which consists of periodic clock pulses between which a "1" is represented by the presence of a pulse and a "0" is represented by the absence of a pulse. The converter is particularly useful for converting a self-clocking information signal read from a magnetic medium to an information signal and a clock pulse wave suitable for application to the signal input and shift input, respectively, of a shift register.

Figure 1:
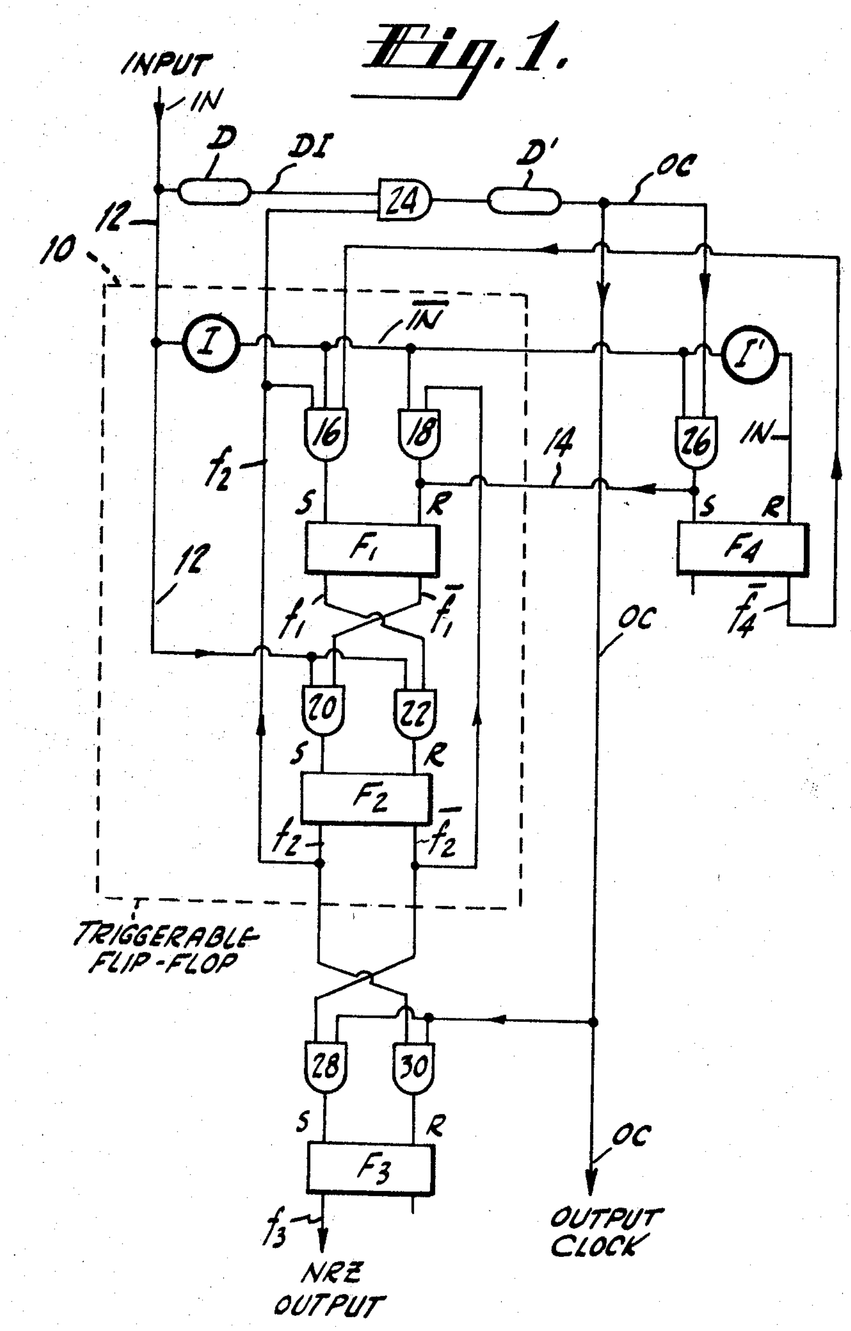

This invention relates to digital information code converters, and has for its object the provision of an improved converter for deriving a simple non-return-to-zero (NZR) information signal and a separate output clock pulse wave from an input signal which consists of periodic clock pulses between which a "1" is represented by the presence of a pulse and a "0" is represented by the absence of a pulse. While not limited thereto, the invention is particularly useful in magnetic recording and reproducing systems for converting a self-clocking information signal read from a magnetic medium to separated information signals and clock pulses utilizable by digital data processing circuits such as shift registers.

In accordance with an example of the invention, there is provided a triggerable flip-flop having an auxiliary input, and having a trigger input receptive to an input signal which consists of periodic clock pulses between which a "1" is represented by the presence of a pulse and a "0" represented by the absence of a pulse. A delayed output clock pulse generating means includes delay and gate means receptive to the input signal and to an output of the triggerable flip-flop to provide an output clock pulse wave. A gate receptive to the input signal and the output of the delayed output clock pulse generating means passes pulses to the auxiliary input of the triggerable flip-flop. Means coupled to the output of the clock pulse generating means and an output of the triggerable flip-flop provide a non-return-to-zero output information signal.

Figure 2:
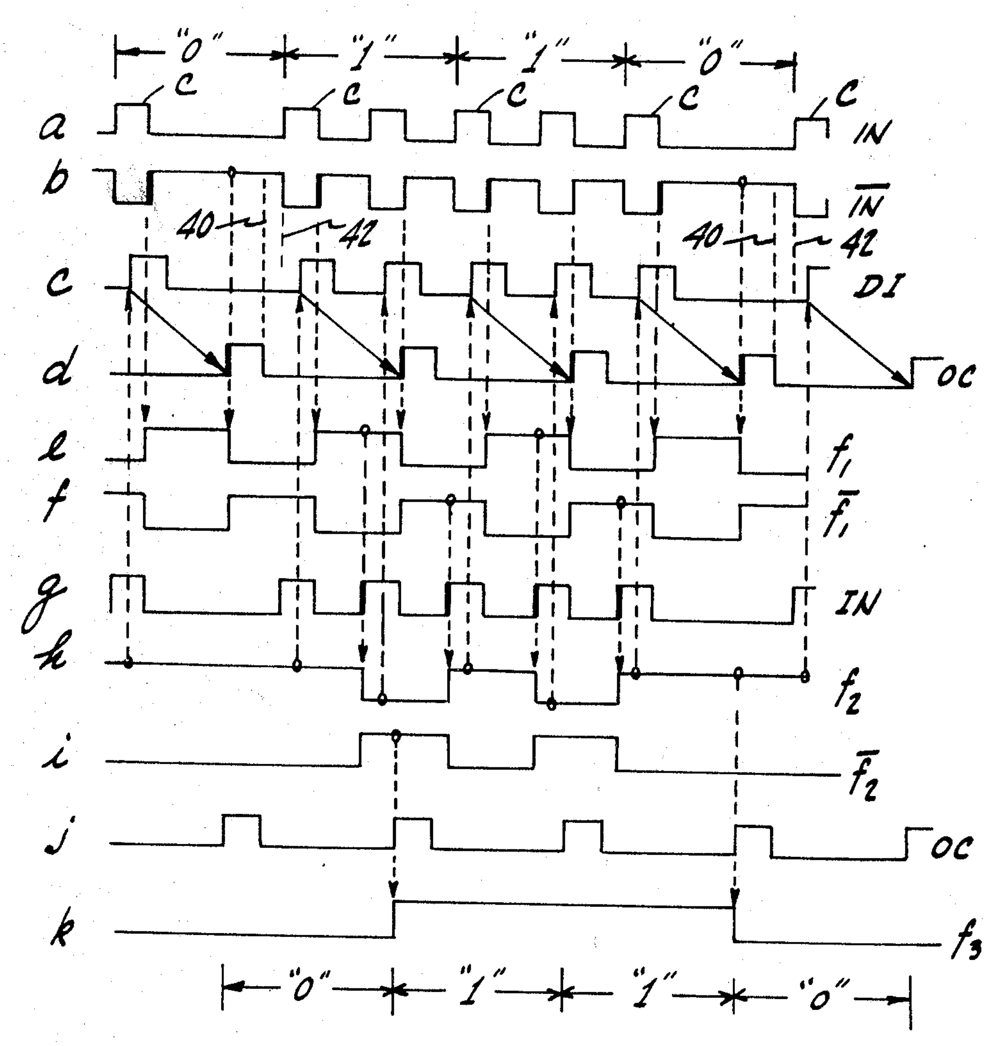

In the drawing:

FIG. 1 is a schematic diagram of a code converter constructed according to the teaching of the invention; and FIG. 2 is a chart of voltage waveforms which will be referred to in describing the operation of the converter of FIG. 1.

Referring now in greater detail to FIG. 1, the converter shown includes a triggerable flip-flop system 10 having a trigger input 12, an auxiliary input 14 and output labeled $f_2$ and $\bar{f}_2$. The triggerable flip-flop 10 includes and inverter I connected from the trigger input 12 to inputs of gates 16 and 18 which have outputs coupled to the set S and reset R inputs, respectively, of a first flip-flop $F_1$. The gates 16 and 18, and all the other gates in FIG. 1, are conventional "and" gates. Other types of gates may, of course, be employed provided that appropriate attention is given to the polarities of the signals involved and the basic functions performed by the gates.

The first flip-flop $F_1$ has outputs $\bar{f}_1$ and $f_1$ connected to inputs of respective gates 20 and 22 having outputs connected to respective set S and reset R inputs of a second flip-flop $F_2$. The trigger input 12 is also connected to inputs of gates 20 and 22. The outputs $f_2$ and $\bar{f}_2$ from the second flip-flop $F_2$ are coupled back to inputs of respective ones of the gates 16 and 18. The second flip-flop $F_2$ in the triggerable flip-flop system 10, *as thus far described,* changes its conductive state every time there is a positive-going transition in an input signal wave applied to the trigger input 12.

A delay means D providing a small delay is connected from the signal input line 12 to an input of a gate 24. The gate 24 also receives an input from the output $f_2$ of the flip-flop $F_2$ in the triggerable flip-flop system 10. The output of gate 24 is connected through a delay means D′ to an output clock line OC. The delay means D′ provides a delay of about three-fourths the information bit cells period of the input signal wave.

The output clock signal at the output of delay means D′ is coupled to a gate 26. The inverted input signal $\overline{IN}$ output from the inverter I is applied to another input of gate 26. The output of gate 26 is coupled to the auxiliary input 14 of the triggerable flip-flop 10. The auxiliary input 14 of triggerable flip-flop 10 is connected to the reset input R of the first flip-flop $F_1$ in the triggerable flip-flop system 10.

The output clock signal line OC is also connected to inputs of gates 28 and 30. Gates 28 and 30 also have inputs coupled to respective outputs $\bar{f}_2$ and $f_2$ from the second flip-flop $F_2$. Gates 28 and 30 have outputs connected to respective set S and reset R inputs of a third flip-flop $F_3$. An output $f_3$ from flip-flop $F_3$ provides the desired non-return-to-zero (NRZ) output signal.

A fourth flip-flop $F_4$ has a set input S coupled to the output of gate 26, and has a reset input R coupled to receive an input signal IN from an inverter I′. The output $\bar{f}_4$ from flip-flop $F_4$ is coupled to an input of gate 16.

The operation of the converter FIG. 1 will now be described with reference to the voltage waveforms shown in FIG. 2. FIG 2*a* shows an input signal IN representing illustrative binary information 0110. The input signal code is one which includes periodic clock pulses C defining the boundaries of information bit cells. A "1" is represented in an information bit cell by the presence of a centrally located pulse. A "0" is represented in an information bit cell by the absence of a centrally located pulse.

The inverter I in the triggerable flip-flop 10 inverts the input signal IN shown in FIG. 2*a* to provide an inverted input signal $\overline{IN}$ as shown in FIG. 2*b*. The delay means D slightly delays the input signal IN to provide a slightly delayed input signal DI as shown in FIG. 2*c*. The slight delay of delay means D may be produced by the inherent delay of an inverter. If an inverter is substituted for the delay means D, the substituted inverter is connected between the output of inverter I and the input of gate 24.

The delayed output clock generating means constituted by the delay D, the gate 24 and the delay D′ operate in response to the input signal IN and the output $f_2$, shown in FIG. 2*h*, from the triggerable flip-flop 10. The gate 24 is enabled to pass a delayed input pulse DI if the output $f_2$ is high. The first such pulse shown in FIG. 2*c* is passed and delayed by delay means D′ to produce the first pulse shown in FIG. 2*d*. The following input clock pulses are similarly passed by gate 24 to produce the output clock wave OC of FIG. 2*d*. The "1" information pulses between the clock pulses in delayed input wave DI are not passed by gate 24 because the gate is disabled by the low potential of signal $f_2$ during the time that the "1" pulses appear.

The first flip-flop $F_1$ is set through gate 16 every time there is a positive-going transition in the inverted input signal $\overline{IN}$ following a clock pulse C. Further, the flip-flop $F_1$ is reset through gate 26 every time there is a positive-going transition in the delayed output clock wave OC. (A positive-going transition in inverted input signal $\overline{IN}$ following a "1" information pulse also tends to reset the flip-flop through gate 18 at the same time that it is being reset through gate 26.) An undesired setting of flip-flop $F_1$ at times designated 40 is prevented by flip-flop $F_4$. The output of gate 26 sets flip-flop $F_4$ at the same time it resets flip-flop $F_1$. The $\bar{f}_4$ output of flip-flop $F_4$ then inhibits gate 16 and prevents a setting of flip-flop $F_1$ until after flip-flop $F_4$ is reset at times 42 by an input signal IN. The gate 26 is employed to insure operation of the system in the correct phase relative to the input signal IN. Correct phasing is accomplished by the use of a preamble consisting of a series of "0's" preceding each message. During the preamble, the input signal IN consists solely of the clock pulses C. The clock pulses are delayed to produce the output clock pulses OC which are applied through gate 26 to the reset input of flip-flop $F_1$. The gate 26 thus establishes and maintains the system in proper phase so that it can distinguish the "1" information pulses from the clock pulses C.

To summarize the operation thus far described, the inverted signal input $\overline{IN}$ and the delayed output clock wave OC applied through gates 16, 18 and 26 to flip-flop $F_1$ cause the flip-flop to produce output $f_1$ and $\bar{f}_1$ as shown in FIGS. 2*e* and 2*f*, respectively.

The input signal IN shown in FIG. 2*a* and repeated in FIG. 2*g* is applied to gates 20 and 22. Flip-flop $F_2$ is set through gate 20 every time there is a positive-going transition in the input signal wave IN and a high output $\bar{f}_1$, show in FIG. 2*f*, from flip-flop $F_1$. Flip-flop $F_2$ is reset through gate 22 every time there is a positive-going transition in the input signal waveform IN and a high output $f_1$ from the flip-flop $F_1$. The setting and resetting of flip-flop $f_2$ results in output waveforms $f_2$ and $\bar{f}_2$ as shown in FIGS. 2*h* and 2*i*, respectively.

Gates 28 and 30 receive the outputs $\bar{f}_2$ and $f_2$ from flip-flop $F_2$, and also receive the delayed output clock OC shown in FIG. 2*d* and repeated in FIG. 2*j*. Flip-flop $F_3$ is set through gate 28 every time there is an output clock pulse OC and a high output $\bar{f}_2$ from flip-flop $F_2$. Flip-flop $F_3$ is reset through gate 30 every time there is a delayed output clock pulse OC and a high output $f_2$ from flip-flop $F_2$. The output $f_3$ shown in FIG. 2*k* is the desired non-return-to-zero (NRZ) output signal carrying the same information included in the input signal IN (FIG. 2*a*). The output signal $f_3$ has a low value to represent "0" information and has a high value to represent "1" information. The NRZ output $f_3$ and the output clock signal OC are suitable for application to the signal input and the shift input, respectively, of a shift register.

What is claimed is:

1. Means for deriving a non-return-to-zero information signal and an output clock pulse wave from an input signal which consists of periodic clock pulses between which a "1" is represented by the presence of a pulse and a "0" is represented by the absence of a pulse, comprising a triggerable flip-flop having a trigger input receptive to said input signal, and having an auxiliary input, delayed output clock pulse generating means including delay and gate means receptive to said input signal and an output of said triggerable flip-flop, a gate receptive to said input signal and the output of said delayed output clock pulse generating means to pass delayed clock pulses to said auxiliary input of the triggerable flip-flop, and means coupled to the output of said clock pulse generating means and an output of said triggerable flip-flop to derive a non-return-to-zero information signal.

2. Means for deriving a non-return-to-zero information signal and an output clock pulse wave from an input signal which consists of periodic clock pulses between which a "1" is represented by the presence of a pulse and a "0" is represented by the absence of a pulse, comprising a triggerable flip-flop having a trigger input receptive to said input signal, and having an auxiliary input, delayed output clock pulse generating means including delay and gate means receptive to said input signal and an output of said triggerable flip-flop, means to apply the output of said delayed output clock pulse generating means to said auxiliary input of the triggerable flip-flop, a set-reset flip-flop, and gate means coupled from the output of said clock pulse generating means and an output of said triggerable flip-flop to an input of said set-reset flip-flop to provide a non-return-to-zero information signal at the output of said set-reset flip-flop.

3. Means for deriving a non-return-to-zero information signal and an output clock pulse wave from an input signal which consists of periodic clock pulses between which a "1" is represented by the presence of a pulse and a "0" is represented by the absence of a pulse, comprising a triggerable flip-flop having a trigger input receptive to said input signal, and having an auxiliary input, delayed output clock pulse generating means including delay and gate means receptive to said input signal and an output of said triggerable flip-flop, a gate receptive to said input signal and the output of said delayed output clock pulse generating means to pass delayed clock pulses to said auxiliary input of the triggerable flip-flop, a set-reset flip-flop, and gate means coupled from the output of said clock pulse generating means and an output of said triggerable flip-flop to an input of said set-reset flip-flop to provide a non-return-to-zero information signal at the output of said set-reset flip-flop.

4. Means for deriving a non-return-to-zero information signal and an output clock pulse wave from an input signal which consists of periodic clock pulses between which a "1" is represented by the presence of a pulse and a "0" is represented by the absence of a pulse, comprising a triggerable flip-flop including first and second set-reset flip-flops, a trigger input coupling said input signal to said first and second flip-flops, and an auxiliary input coupled to said first flip-flop, delayed output clock pulse generating means including delay and gate means receptive to said input signal and an output of said triggerable flip-flop, means to apply the output of said delayed output clock pulse generating means to said auxiliary input of the triggerable flip-flop, a third flip-flop, gate means coupled from the output of said clock pulse generating means and an output of said triggerable flip-flop to the input of said third flip-flop, and means to derive a non-return-to-zero information signal from the output of said third flip-flop.

5. Means for deriving a non-return-to-zero information signal and an output clock pulse wave from an input signal which consists of periodic clock pulses between which a "1" is represented by the presence of a pulse and a "0" is represented by the absence of a pulse, comprising a triggerable flip-flop including first and second set-reset flip-flops, a trigger input coupling said input signal to said first and second flip-flops, and an auxiliary input coupled to said first flip-flop, delayed output clock pulse generating means including delay and gate means receptive to said input signal and an output of said triggerable flip-flop, a gate receptive to said input signal and the output of said delayed output clock pulse generating means to pass delayed clock pulses to said auxiliary input of the triggerable flip-flop,
a third flip-flop,
gate means coupled from the output of said clock pulse generating means and an output of said triggerable flip-flop to the input of said third flip-flop, and
means to derive a non-return-to-zero information signal from the output of said third flip-flop.

6. Means for deriving a non-return-to-zero information signal and an output clock pulse wave from an input signal which consists of periodic clock pulses between which a "1" is represented by the presence of a pulse and a "0" is represented by the absence of a pulse, comprising
a signal input terminal receptive to said input signal,
a triggerable flip-flop system including a first flip-flop, gates coupling said signal input terminal to inputs of said first flip-flop, a second flip-flop, and gates coupling said signal input terminal and the outputs of said first flip-flop to inputs of said second flip-flop,
delayed output clock pulse generating means including delay and gate means having inputs coupled to said signal input terminal and to an output of said second flip-flop,
a gate coupled from said clock pulse generating means and said signal input terminal to pass delayed clock pulses to an input of said first flip-flop, and
means coupled to the output of said clock pulse generating means and the output of said second flip-flop to derive a non-return-to-zero information signal.

7. Means for deriving a non-return-to-zero information signal and an output clock pulse wave from an input signal which consists of periodic clock pulses between which a "1" is represented by the presence of a pulse and a "0" is represented by the absence of a pulse, comprising
a signal input terminal receptive to said input signal,
a triggerable flip-flop system including a first flip-flop, gates coupling said signal input terminal to inputs of said first flip-flop, a second flip-flop, and gates coupling said signal input terminal and the outputs of said first flip-flop to inputs of said second flip-flop,
delayed output clock pulse generating means including delay and gate means having inputs coupled to said signal input terminal and to an output of said second flip-flop,
a gate coupled from said clock pulse generating means and said signal input terminal to pass delayed clock pulses to an input of said first flip-flop,
a third flip-flop,
gate means coupled from the output of said clock pulse generating means and the output of said second flip-flop to the input of said third flip-flop, and
means to derive a non-return-to-zero information signal from the output of said third flip-flop.

References Cited

UNITED STATES PATENTS 3,158,839 11/1964 Anderson ---------- 340—347 X

MAYNARD R. WILBUR, *Primary Examiner.*

M. K. WOLENSKY, *Assistant Examiner.*

U.S. Cl. X.R.

307—232